(12) United States Patent
Mueller et al.

(10) Patent No.: US 9,570,998 B2
(45) Date of Patent: Feb. 14, 2017

(54) CAPACITOR ARRANGEMENT FOR AN INTERMEDIATE CIRCUIT OF A VOLTAGE CONVERTER

(71) Applicant: SMA Solar Technology AG, Niestetal (DE)

(72) Inventors: Burkard Mueller, Kassel (DE); Jens Friebe, Vellmar (DE)

(73) Assignee: SMA Solar Technology AG, Niestetal (DE)

( * ) Notice: Subject to any disclaimer, the term of this patent is extended or adjusted under 35 U.S.C. 154(b) by 253 days.

(21) Appl. No.: 14/140,985

(22) Filed: Dec. 26, 2013

(65) Prior Publication Data

US 2014/0112025 A1   Apr. 24, 2014

Related U.S. Application Data

(63) Continuation of application No. PCT/EP2011/067595, filed on Oct. 7, 2011.

(30) Foreign Application Priority Data

Jun. 30, 2011 (DE) .......... 10 2011 051 482

(51) Int. Cl.
*H02M 3/335* (2006.01)
*H02M 7/5387* (2007.01)
(Continued)

(52) U.S. Cl.
CPC .......... *H02M 3/33569* (2013.01); *H02M 1/10* (2013.01); *H02M 7/5387* (2013.01);
(Continued)

(58) Field of Classification Search
CPC ............. H02M 2001/0074; H02M 7/5387; H02M 7/487; H02M 7/493; H02M 1/10; H02M 3/33569; H02M 3/24; H02M 2001/007; H02M 3/1584; H02M 7/48; H02J 1/102; H02J 3/383; H02J 3/385; Y02E 10/56
(Continued)

(56) References Cited

U.S. PATENT DOCUMENTS 5,310,992 A * 5/1994 Karino ................ B23K 9/1056
                                                       219/130.21
5,930,122 A * 7/1999 Moriguchi .............. H02M 1/10
                                                            363/17
(Continued)

FOREIGN PATENT DOCUMENTS

DE          3821987 A1    1/1990
JP         S55131272 A   10/1980

OTHER PUBLICATIONS

International Preliminary Report on Patentability Dated Jan. 7, 2014 U.S. Appl. No. 14/140,985.
(Continued)

*Primary Examiner* — Jessica Han
*Assistant Examiner* — Demetries A Gibson
(74) *Attorney, Agent, or Firm* — Eschweiler & Associates, LLC

(57) ABSTRACT

The disclosure relates to a capacitor arrangement for an input circuit or intermediate circuit of a voltage transformer comprising at least two capacitors and two connection nodes. Switching elements are provided, by means of which the at least two capacitors are connected in parallel with each other in a first operating state and are connected in series with each other in a second operating state. The disclosure also relates to a voltage transformer arrangement comprising such a capacitor arrangement and an operating method for a capacitor arrangement.

11 Claims, 6 Drawing Sheets

(51) Int. Cl.
*H02M 1/10* (2006.01)
*H02M 7/487* (2007.01)
*H02M 7/493* (2007.01)
*H02M 1/00* (2006.01)

(52) U.S. Cl.
CPC ............ *H02M 7/487* (2013.01); *H02M 7/493* (2013.01); *H02M 2001/0074* (2013.01); *Y02E 10/56* (2013.01)

(58) Field of Classification Search
USPC ............. 219/130, 130.21; 363/17, 132, 142; 307/109, 110; 327/536
See application file for complete search history.

(56) References Cited

U.S. PATENT DOCUMENTS

| | | | | |
|---|---|---|---|---|
| 6,031,738 | A * | 2/2000 | Lipo | H02M 7/487 363/37 |
| 6,054,674 | A * | 4/2000 | Moriguchi | B23K 9/1043 219/130.21 |
| 6,091,049 | A * | 7/2000 | Ikeda | B23K 9/0953 219/130.21 |
| 6,269,015 | B1 * | 7/2001 | Ikeda | B23K 9/091 219/130.21 |
| 6,754,090 | B2 * | 6/2004 | Arai | H02M 3/28 363/17 |
| 7,109,438 | B2 * | 9/2006 | Ishii | H02M 1/10 219/130.1 |
| 7,800,346 | B2 * | 9/2010 | Bolz | H02J 7/0014 320/116 |
| 2001/0048606 | A1 | 12/2001 | Mallory | |
| 2002/0056708 | A1 | 5/2002 | Moriguchi et al. | |
| 2002/0063116 | A1 | 5/2002 | Ikeda et al. | |
| 2002/0126517 | A1 | 9/2002 | Matsukawa et al. | |
| 2004/0037092 | A1 | 2/2004 | Kurio et al. | |
| 2004/0047092 | A1 | 3/2004 | West | |
| 2005/0035724 | A1 * | 2/2005 | Lurkens | H05B 41/2881 315/291 |
| 2007/0165433 | A1 | 7/2007 | Katooka et al. | |
| 2009/0154200 | A1 | 6/2009 | Coccia et al. | |
| 2009/0236917 | A1 * | 9/2009 | Bettenwort | H02J 1/102 307/82 |
| 2010/0141220 | A1 * | 6/2010 | Abe | H02M 3/33569 320/167 |

OTHER PUBLICATIONS

International Search Report dated Jan. 20, 2012 for International Application No. PCT/EP2011/067595. 3 Pages.
International Preliminary Report on Patentability Dated Jan. 7, 2014 International Application No. PCT/EP2011/067595.

* cited by examiner

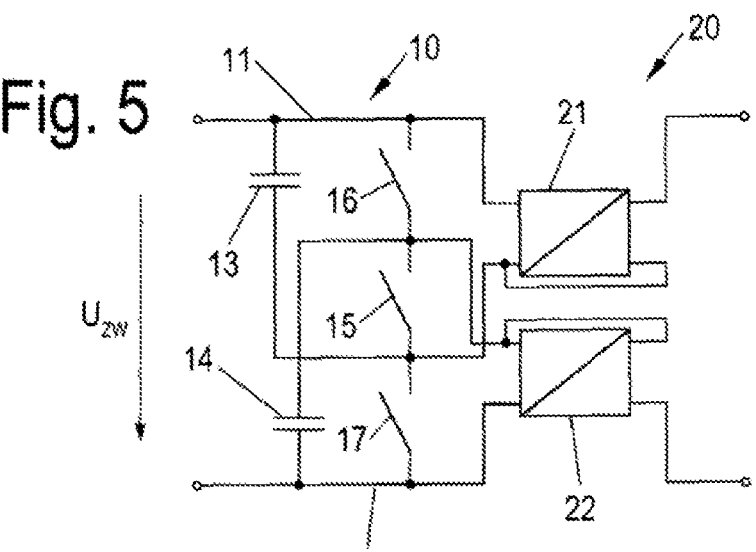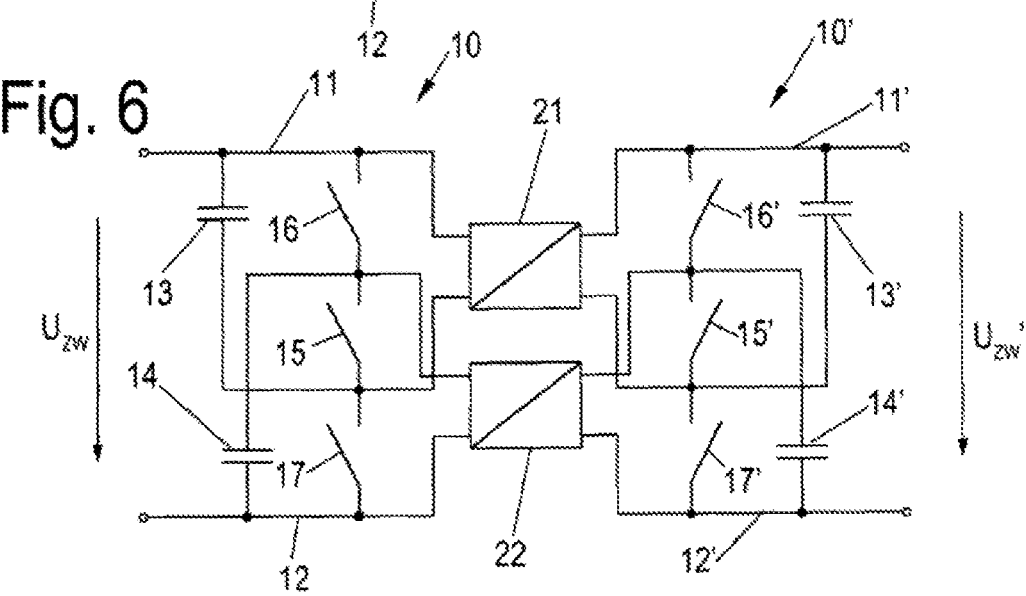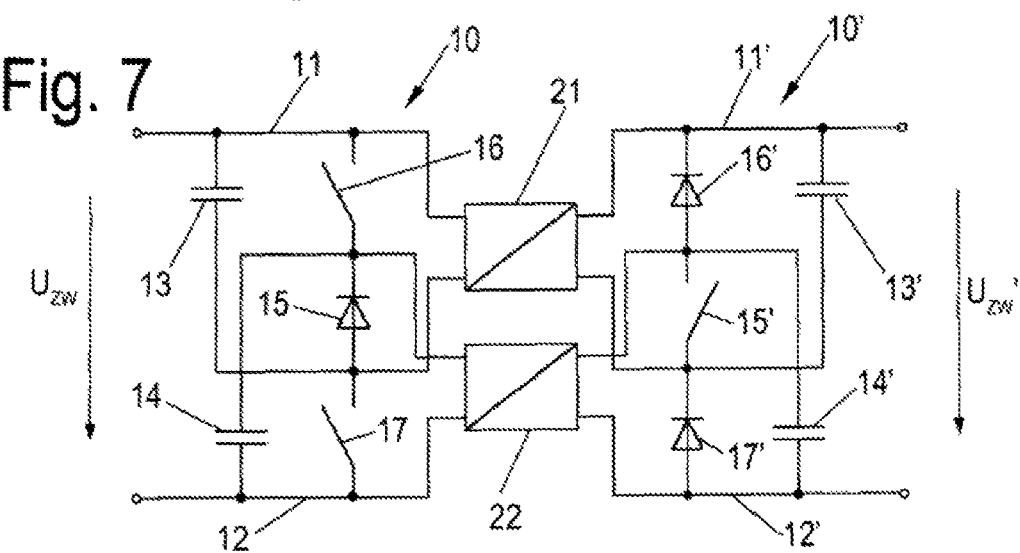

CAPACITOR ARRANGEMENT FOR AN INTERMEDIATE CIRCUIT OF A VOLTAGE CONVERTER

REFERENCE TO RELATED APPLICATIONS

This application is a continuation of international application number PCT/EP2011/067595 filed on Oct. 7, 2011, which claims priority to German application number 10 2011 051 482.1 filed on Jun. 30, 2011.

FIELD

The disclosure relates to a capacitor arrangement for an input circuit or intermediate circuit of a voltage converter, and to a voltage converter and an operating method for a voltage converter.

BACKGROUND

Voltage converters serve to convert an input voltage into an output voltage. In this case, input and output voltages can differ both in terms of their magnitude and in terms of their voltage type, that is to say DC voltage (DC—direct current) or AC voltage (AC—alternating current). Voltage converters in the context of the application should therefore be understood to mean, in particular, DC voltage converters, also designated hereinafter as DC/DC converters, and inverter bridges, also designated hereinafter as DC/AC converters. Inverters, which are used for example in a photovoltaic installation, a fuel cell system or for battery-fed standby power installations in a local power supply system, have as an output stage at least one DC/AC converter, upstream of which a DC/DC converter can be connected as an input stage. In an inverter, such a DC/DC converter connected upstream usually serves to increase the voltage variation range at the input of the inverter. By way of example, when an inverter is used in a photovoltaic installation, the input voltage present at the inverter changes if the operating point of photovoltaic modules of the photovoltaic installation is varied depending on the load and the insolation, i.e. the intensity of the solar irradiation.

In many cases of use, the voltage of a power source feeding a voltage converter is not constant. By way of example, it changes in a photovoltaic installation if the operating point of photovoltaic modules of the photovoltaic installation varies in an insolation- and load-dependent manner. In a battery-fed standby power installation, the battery voltage as input voltage of a voltage converter is dependent on the transmitted load and the charge state of the battery. The cell voltage of a fuel cell as input voltage of a voltage converter likewise varies to a special degree precisely in the low-load range. An additional factor is that in many cases one would like to be able to connect different types of PV modules, fuel cells or batteries to a voltage converter, such that a largest possible input voltage range of the converter enables a greatest possible flexibility.

Voltage converters usually do not continuously load the power source connected to their input. This is caused for example by a non-continuous power flow in the case of an AC current that is output, or else a pulsed switching of power semiconductor switches in the voltage converter. In order to minimize voltage dips occurring at the power source on account of the current being drawn in a non-continuous manner, and thus to enable a high average power drawn from the power source, a capacitor arrangement is usually provided at the input of a voltage converter. In the simplest case, the capacitor arrangement consists of a capacitor connected in parallel with the input of the voltage converter. If such a capacitor arrangement is positioned between two voltage converters in the case of an arrangement comprising a plurality of voltage converters, it is usually designated as an intermediate circuit capacitor arrangement. In the context of this application, independently of the position of the capacitor arrangement, in a generalizing manner hereinafter the circuit in which the capacitor arrangement is arranged is designated as intermediate circuit, following the usual terminology. The capacitance of the capacitor arrangement is chosen depending on the magnitude of the maximum voltage dips that can be afforded tolerance during the the non-continuous current drawing (voltage ripple), operating parameters, the topology of the voltage converter and, in particular, the minimum voltage for maximum energy conversion. In the case of inverters in the field of photovoltaics, input or intermediate circuit capacitors having a capacitance of a few millifarads are not unusual for the voltage converters. At the same time, the voltages applied to the capacitor arrangements are in the range of 1000 volts or more. Capacitors having such a capacitance and dielectric strength are large and heavy. Moreover, they are expensive and, under certain circumstances, available only to an insufficient extent. If, for a desired capacitance, capacitors having the required dielectric strength are not obtainable, it is known to connect two capacitors having lower dielectric strength in series. Ideally, half of the voltage which is present at the series circuit formed by the two capacitors is then present in each case at the two capacitors. On account of component tolerances, however, different capacitors differ in terms of their properties, for example with regard to their internal resistance and their leakage current. As a result, different voltages can be established at the two series-connected capacitors during operation, which reduces the voltage range that can be utilized overall. For matching the voltages, it is known to bring the center tap between the two capacitors, via a resistance bridge or via a bridge having active switching elements, to a potential lying exactly between the potentials at the connections of the capacitor arrangement. In the case of the series circuit formed by the capacitors, however, the total capacitance of the capacitor arrangement decreases to a value of only half the capacitance of one of the capacitors.

SUMMARY

It is an object of the present disclosure to specify a capacitor arrangement for an input circuit, output circuit or intermediate circuit of a voltage converter which can be operated in a wide voltage range and can provide a non-continuous power flow with little voltage fluctuation, even if a power flowing in on the input side is substantially constant. It is a further object to specify a voltage converter arrangement comprising such a capacitor arrangement and an operating method for such a voltage converter.

This object is achieved by means of a capacitor arrangement, a voltage converter and an operating method with the respective features of the independent claims. Configurations and advantageous developments of the disclosure are specified in the dependent claims.

According to the disclosure, a capacitor arrangement for an input circuit or intermediate circuit of a voltage converter comprises at least two capacitors, wherein switching members are provided, by means of which the at least two capacitors are connected to the connection nodes in a manner connected in parallel in a first operating state and in series in a second operating state. In the case of capacitors, the energy content increases as a square of the voltage. Accordingly, the magnitude of voltage dips when power is drawn from a capacitor having a given capacitance is smaller at higher voltage than at lower voltage. Conversely, that means that at higher voltages only smaller capacitances than at lower voltages are required in the intermediate circuit, in order to prevent the voltage from dipping more than a specific amount. The disclosure makes use of this insight by virtue of the fact that, by means of the switching members provided, the capacitor arrangement is formed from a parallel or alternatively a series connection of the two capacitors. When the two capacitors are connected in parallel, with correspondingly lower maximum input voltage, the sum of the capacitances of the two capacitors can be provided in the first operating state. In the second operating state, the capacitance is lower, but the high dielectric strength required for example during no-load operation of the photovoltaic modules is achieved. The disclosure thus exploits the fact that dielectric strength and high capacitance are not required simultaneously.

In a further advantageous configuration of the capacitor arrangement, the switching members are arranged and embodied in such a way that an inflow of charge into the at least two capacitors is prevented in a third operating state. In this third operating state, the capacitor arrangement can thus be exposed to voltages which are still above the maximum voltage in the case where the two capacitors are connected in series. If charge is no longer taken up by the capacitors, the capacitors effectively also do not provide a capacitance for the input circuit or intermediate circuit. Nevertheless, the third operating state can advantageously be used if, although a high voltage is present in the input circuit or intermediate circuit, no or only small currents flow. By virtue of the fact that in this voltage range the capacitors are effectively decoupled from the input circuit or intermediate circuit, they can be designed for a smaller voltage than the maximum voltage, without the functionality of the voltage converter or that of the system comprising power source and voltage converter being impaired.

A voltage converter arrangement according to the disclosure, which comprises in particular a DC/DC converter and/or a DC/AC converter for a photovoltaic installation, is distinguished by the fact that it has a capacitor arrangement of this type in an input circuit, output circuit or intermediate circuit. The resulting advantages of the voltage converter arrangement correspond to the advantages mentioned in connection with the capacitor arrangement.

In one advantageous configuration of the voltage converter arrangement, a respective DC/DC converter is assigned to a respective one of the capacitors of the capacitor arrangement. In this case each of the DC/DC converters assigned to the capacitors comprises in each case two series-connected semiconductor switching elements, wherein at least one of the two series-connected semiconductor switching elements is actively switchable. In this way, semiconductor switching elements having a lower dielectric strength can be used within the voltage converter arrangement. The advantage afforded according to the disclosure in the case of the capacitor arrangement with regard to the required dielectric strength of the capacitors is thus also applied to semiconductor switching elements in the voltage converter arrangement.

A method according to the disclosure for operating a voltage converter arrangement of this type is distinguished by the fact that depending on a voltage present at the connection nodes of the capacitor arrangement, the at least two capacitors are interconnected either in parallel in a first operating state or in series in a second operating state. The resulting advantages of the operating method correspond to the advantages mentioned in connection with the capacitor arrangement.

In accordance with one advantageous configuration of the operating method, the first operating state is adopted if the voltage present at the connection nodes is less than a predefined first threshold voltage. The second operating state is adopted if the voltage is greater than or equal to the first threshold voltage. In accordance with a further advantageous configuration, the change of operating state can be provided with a switching hysteresis in which the operating state is maintained in a hysteresis band around the first threshold voltage and a change of operating state is initiated, if appropriate, only when the band is left. This makes it possible to avoid unnecessary changing as a result of the first threshold voltage being exceeded or undershot only slightly or momentarily.

In a further advantageous configuration of the operating method, a third operating state is provided, in which the at least two capacitors are decoupled from the input circuit or intermediate circuit in such a way that no charge inflow into the capacitors takes place. In that case the first operating state is adopted if the voltage present at the connection nodes is less than or equal to a predefined first threshold voltage, the second operating state is adopted if the voltage is greater than the first threshold voltage and less than a second threshold voltage, and the third operating state is adopted if the voltage is greater than the second threshold voltage, wherein the second threshold voltage is greater than the first threshold voltage.

BRIEF DESCRIPTION OF THE DRAWINGS

The disclosure is explained in greater detail below on the basis of example embodiments with the aid of nine figures.

In the figures:

FIGS. 5-7 show schematic illustrations of voltage converters with assigned capacitor arrangements.

DETAILED DESCRIPTION

Figure 1:
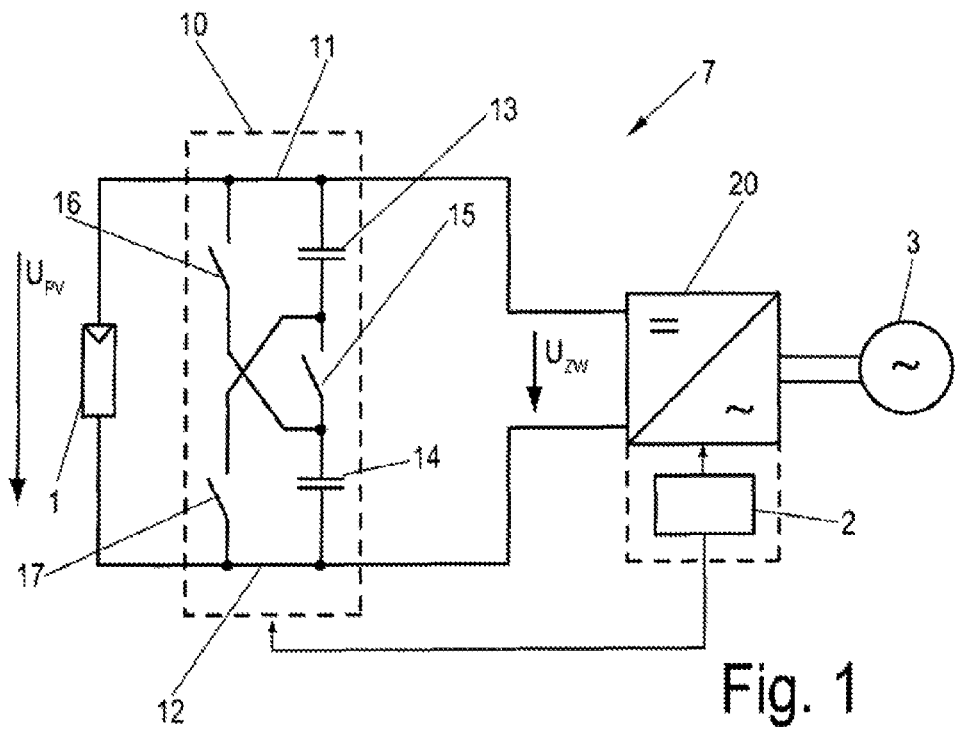
FIG. 1 shows a schematic illustration of a PV installation in a first exemplary embodiment.

FIG. 1 shows a PV installation 7 in a schematic illustration. The PV installation comprises a PV generator 1, which provides at its outputs electrical power in the form of DC current at a photovoltaic output voltage Upv, designated in an abbreviated form as PV voltage Upv.

By way of example, the PV generator 1 is symbolized by the circuit symbol of an individual photovoltaic cell in FIG. 1. In an implementation of the PV installation illustrated, the PV generator 1 can be an individual PV module having a multiplicity of cells, or an interconnection of a plurality of PV modules, in particular in a series interconnection to form a string or a plurality of strings connected in parallel.

The PV generator 1 is connected to a capacitor arrangement 10 by means of DC lines, the capacitor arrangement being arranged in parallel with an input of an inverter 20 by means of two connection nodes 11, 12.

In the embodiment illustrated, the capacitor arrangement 10 is thus arranged in a (direct-current) input circuit of the inverter 20. In the case of inverters which are constructed in a multi-stage fashion and which, besides an inverter bridge, also have such an upstream DC voltage converter (DC/DC converter), such a capacitor arrangement 10 can alternatively or additionally be provided at the output of the DC/DC converter in a so-called intermediate circuit. As already explained in the introduction, in the context of this application, independently of the position of the capacitor arrangement 10, in a generalizing manner the circuit in which the capacitor arrangement 10 is arranged is designated as intermediate circuit following the usual terminology.

The voltage present at the capacitor arrangement 10 between the connection nodes 11 and 12 is designated hereinafter as intermediate circuit voltage Uzw. In the present embodiment in FIG. 1, apart from line losses in the DC voltage lines, the voltage substantially corresponds to the photovoltaic voltage Upv.

The capacitor arrangement comprises two capacitors 13, 14, which are connected to one another and to the connection nodes 11, 12 via switching members 15, 16, 17. In this case, each of the capacitors 13, 14 is connected to one of the connection nodes 11, 12 by in each case one of its connections. The respective other connection of each capacitor 13, 14 firstly is connected to the respective other connection node 12 or 11 via in each case one of the switching members 16, 17 and secondly these other connections of the capacitors 13, 14 are connected to one another via the switching member 15. The capacitors 13, 14 serve for smoothing the intermediate circuit voltage Uzw in the event of current being drawn non-continuously by the inverter 20.

The capacitor arrangement 10 can be embodied as a separate unit, or else be integrated into the inverter 20. Furthermore, a control device 2 is provided, which controls the switching members 15-17 of the capacitor arrangement 10 and also the inverter 20 in the embodiment illustrated. As is illustrated by the dashed extension of the inverter 20 downward, the control device 2 can advantageously be integrated in the inverter 20. Details concerning the function of the switching members 15-17 of the capacitor arrangement 10 are explained below in connection with the operating method illustrated in FIG. 2.

The inverter 20 is connected to a single- or multiphase power supply system 3 via AC outputs. The power supply system 3 can be a public supply system or a private supply system (island operation). By way of example, the inverter 20 having only two AC outputs is designed for single-phase feeding into the power supply system 3. It goes without saying that a different design than the illustrated single-phase design of the inverter 20 is also possible, e.g. a three-phase design.

FIG. 1 only shows the elements of the PV installation which are essential in the context of the application. By way of example, switching members (e.g. disconnectors), filters (e.g. sine filters), system monitoring devices and/or transformers, not illustrated, can be provided on the AC side of the inverter 20. Likewise, elements not illustrated here, such as fuse members or switching members, e.g. load disconnecting switches, DC contactors, can be arranged on the DC side in the connection between the PV generator 1 and the capacitor arrangement or the inverter 20.

A method for operating a capacitor arrangement in a PV installation such as can be performed for example within the PV installation shown in FIG. 1 is explained below with reference to FIGS. 2 and 3. The reference signs used here refer for example to the embodiment illustrated in FIG. 1. The principles of the method will firstly be elucidated with reference to FIG. 2.

Figure 2:
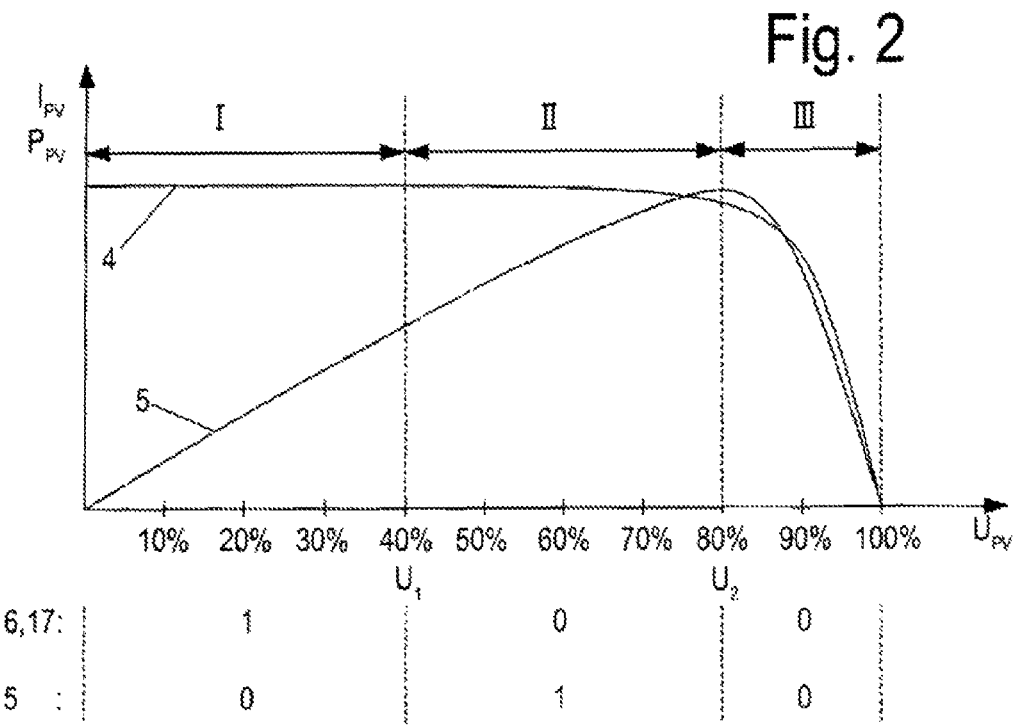
FIG. 2 shows an illustration of PV current and PV power as a function of a PV voltage and operating states of a capacitor arrangement that are correlated with the PV voltage.

FIG. 2 schematically shows in the upper part typical dependencies of a PV current Ipv (curve 4) and of a PV power Ppv (curve 5) on the PV voltage Upv of a PV generator. In this case, the PV voltage Upv is specified relative to a maximum voltage of the PV generator, which is also designated as the no-load voltage. In the case of the PV installation 7 illustrated in FIG. 1, it corresponds to the maximum voltage in the intermediate circuit, which is designated hereinafter as Umax.

In FIG. 2, the voltage range of the PV voltage Upv is subdivided into three voltage ranges by dashed lines at a first and a second threshold voltage U1 and U2, respectively, wherein each of these voltage ranges is assigned an operating state I, II or III of the capacitor arrangement 10. It is assumed here that the intermediate circuit voltage Uzw corresponds to the specified PV voltage Upv.

The lower part of FIG. 2 represents switching states of the switching members 16 and 17 (top) and of the switching member 15 (bottom) which serve for setting the respective operating state I, II or III. In the switching states, a zero stands for an open switching member 15-17 and a one stands for a closed switching member 15-17. The assignment of the switching states to the voltage ranges is illustrated only by way of example; the switching limits can be chosen for other voltages or the voltage ranges can even overlap if a control method exhibiting hysteresis is chosen.

In the first operating state I, the switching member 15 is open and the switching members 16 and 17 are closed. In this operating state I, the two capacitors 13 and 14 are connected to the connection nodes 11 and 12 in a manner connected in parallel. A total capacitance corresponding to the sum of the individual capacitances of the capacitors 13 and 14 forms between the connection nodes. It is assumed for the following description that both capacitors 13, 14 have an identical capacitance C and an identical maximum operating voltage at their connections Uc, also called dielectric strength. In the first operating state I, the capacitor arrangement 10 then has a capacitance of 2·C and a maximum operating voltage Uc at its connection nodes 11, 12.

In the second operating state II, the switching members 16 and 17 are open and the switching member 15 is closed. In this operating state II, the two capacitors 13 and 14 are connected to the connection nodes 11 and 12 in a manner connected in series. In the second operating state II, the capacitor arrangement 10 then has a capacitance of 0.5·C at a maximum operating voltage of 2·Uc at its connection nodes 11, 12.

Finally, in the third operating state III, the switching members 15, 16 and 17 are open. In this operating state III, the two capacitors 13 and 14 are decoupled from the connection nodes 11 and 12 in terms of voltage. In this third operating state III, the maximum operating voltage is determined only by the dielectric strength of the switching members 15-17, but no capacitance is provided at the connection nodes 11, 12 by the capacitor arrangement 10.

As shown by curve 4, the PV current Ipv falls monotonically with rising PV voltage Upv and thus also rising intermediate circuit voltage Uzw. The assignment of the operating states I, II and III takes account of this circumstance: the first operating state I, in which the highest PV current Ipv is present, provides the highest capacitance for buffering the intermediate circuit voltage Uzw, whereas the second operating state II, in which the PV current Ipv is lower, although only a lower capacitance is provided, in return the capacitor arrangement 10 has a higher dielectric strength. Finally, the third operating state III is adopted in a voltage range in which typically no or only little current is drawn.

PV generators are usually operated at an operating point of maximum power by means of a so-called MPP (Maximum Power Point) tracking device, also called MPP tracker. Under normal feeding operating conditions of the PV generator, the operating point typically lies in a range of 30% to 80% of the no-load voltage. The transitions between the operating states I and II, and II and III are predefined at 40% and 80% in the example illustrated. Consequently, during feeding operation, that is to say when the PV generator 1 supplies an appreciable PV current Ipv, the capacitor arrangement 10 is operated in one of the operating states I or II in which the capacitor arrangement 10 provides a capacitance.

Figure 3:
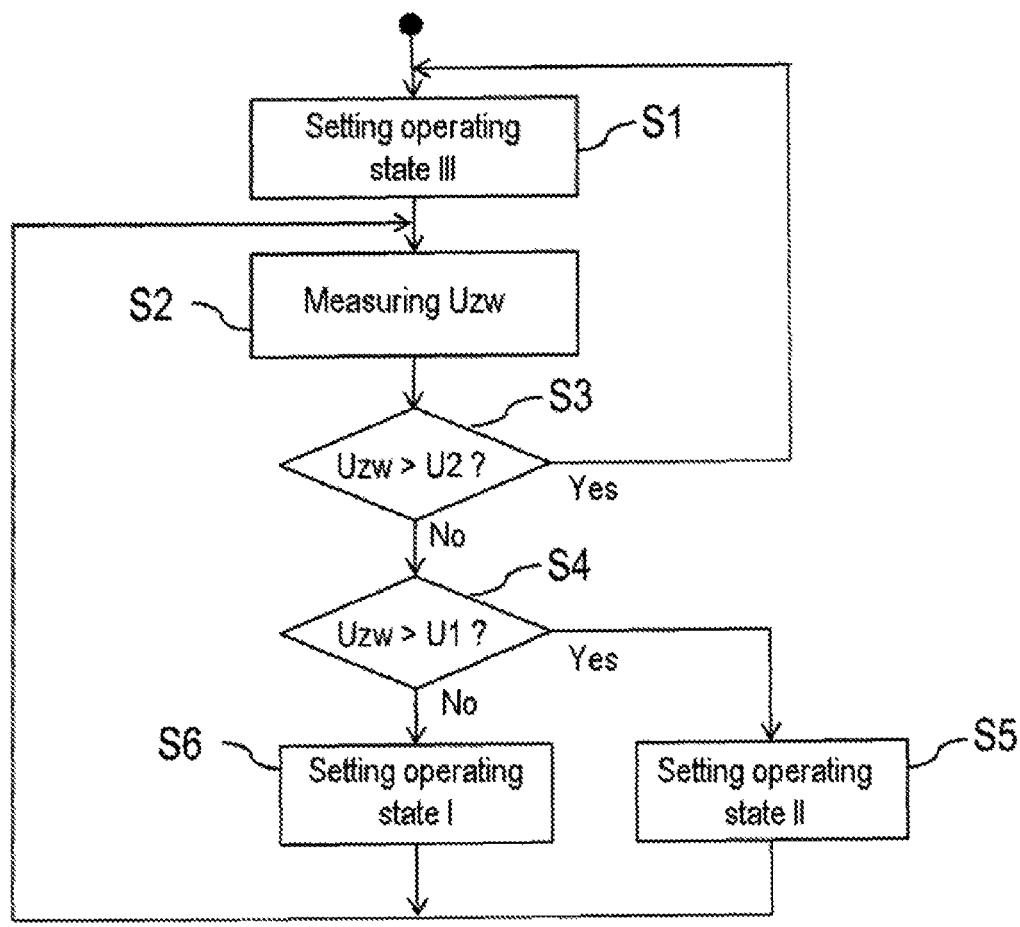
FIG. 3 shows a flowchart of an operating method for a capacitor arrangement.

FIG. 3 illustrates an operating method for setting operating states for a capacitor arrangement in a flowchart.

At S1, firstly the third operating state III is set. At S2, the intermediate circuit voltage Uzw present at the node 11, 12 of the capacitor arrangement 10 is measured. This can be performed by the control device 2 of FIG. 1 by means of corresponding taps. It is likewise conceivable for a measurement to be performed by the inverter 20, the measurement result being passed on in a suitable form to the control device 2.

In the control device 2, the measured intermediate circuit voltage Uzw is then compared with the second threshold voltage U2 at S3. If the intermediate circuit voltage is greater than the second threshold voltage, the method branches back to S1, in which the third operating state III remains set and the intermediate circuit voltage is measured anew in the subsequent act S2.

If, at S3, it was ascertained that the intermediate circuit voltage Uzw is not greater than the second threshold value U2, the method is continued at S4, in which the measured intermediate circuit voltage Uzw is compared with the first threshold value U1. If the intermediate circuit voltage Uzw is greater than the first threshold value U1, the method branches to S5, otherwise to S6.

At S5, the second operating state II is set by the switching members 16 and 17 being opened and by the switching member 15 subsequently being closed, the capacitors 13, 14 being connected in series in the second operating state. Depending on the charge state of the capacitors 13, 14, that is to say in particular depending on whether the second operating state II is set from a previous third operating state III or the first operating state I, high charging or discharging currents through the capacitors 13, 14 can momentarily occur during the closing of the switching member 15 for producing the series interconnection of the capacitors. In order to prevent these currents from becoming excessively high, provision can be made for switching on the switching member 15 for example firstly in a pulsed manner with short clock times in order to enable a slow matching of the voltage of the capacitors 13, 14 to the prevailing intermediate circuit voltage Uzw. Alternatively, it is possible firstly to use a resistor (not illustrated in FIG. 1) for connecting the capacitors 13, 14 for a certain time period, the resistor being bridged by the switching member 15 after the time period has elapsed. Given a suitable design of the switching member 15, by means of corresponding driving, the switching member itself can constitute the resistor (resistive linear operation of the switching member).

While the capacitor arrangement 19 is in the operating state II, provision can furthermore be made, by the switching members 16, 17 being driven in a pulsed manner as necessary or by linear operation of the switching members 16, 17 being set, for using these switching members to compensate for voltages that deviate from one another and are possibly established at the capacitors 13, 14 in such a way that both are charged to an identical voltage level as much as possible at any time.

At S6, the first operating state I, in which the capacitors 13, 14 are connected in parallel, is set by the switching member 15 being opened and the switching members 16, 17 subsequently being closed. In this case, too, large compensation currents can flow, both from the capacitor arrangement 10 to the inverter 20 or to the PV generator 1, and between the capacitors 13 and 14, if the latter have different voltage levels before the parallel interconnection. As indicated above, a different voltage level of the capacitors 13, 14 can be prevented by corresponding operating control in the second operating state II. If different voltages are nevertheless present, it is conceivable, for example, firstly to connect one of the capacitors 13, 14 to the intermediate circuit by switching on the corresponding switching member 17 or 16 and to bring the corresponding other of the capacitors 14, 13 slowly to the same voltage by actuating the switching member 16 or 17 by pulsed operation or by linear operation, that is to say resistively. Alternatively, it is also possible firstly to discharge the capacitors 13, 14 by simultaneously closing all the switching members 15-17, for example, in pulsed or linear operation, and then to open the switching member 15 and to charge the capacitors 13, 14, then connected in parallel, again by the PV generator 1. The first-mentioned solutions are performed in one embodiment for reasons of energy efficiency and loading of the switching members 15, 17 and of the capacitors 13, 14.

In alternative configurations of the method presented, provision can be made for providing the changeover between different operating states I to III with a changeover hysteresis. In such a case, a changeover from the first operating state I to the second operating state II, by comparison with the changeover from the second operating state II to the first operating state I, is effected only at an intermediate circuit voltage Uzw increased by a hysteresis bandwidth relative to the first threshold voltage U1. Correspondingly, a changeover from the second operating state II to the third operating state III, by comparison with the changeover from the third operating state III to the second operating state II, is likewise effected at an intermediate circuit voltage Uzw increased by a hysteresis bandwidth (possibly different than that mentioned above) relative to the second threshold voltage U2. In this way, defined changeover processes are achieved and frequent changeover between operating states is prevented, particularly if the intermediate circuit voltage Uzw is precisely in the range of one of the threshold voltages U1 or U2.

The operating method described in connection with FIGS. 2 and 3 and the choice of the threshold voltages U1, U2 as 40% and 80%, respectively, of the maximum intermediate circuit voltage Umax that occurs make it possible to use capacitors having a dielectric strength of 40% of the maximum intermediate circuit voltage Umax as capacitors 13, 14. It is noted that the operating state III is optional for an operating method according to the application. An operating method according to the application can also be implemented with only two operating states, the first operating state I and the second operating state II, wherein in this case only the first threshold voltage U1 is relevant, which is in one embodiment fixed at half the maximum intermediate circuit voltage Umax, wherein a hysteresis for the changeover from one operating state to the other can once again be used. In such a configuration, capacitors having a dielectric strength of 50% of the maximum intermediate circuit voltage Umax can be used as capacitors 13, 14. The capacitor arrangement 10 then provides a capacitance of 2 C or 0.5 C over the entire voltage range.

Figure 4:
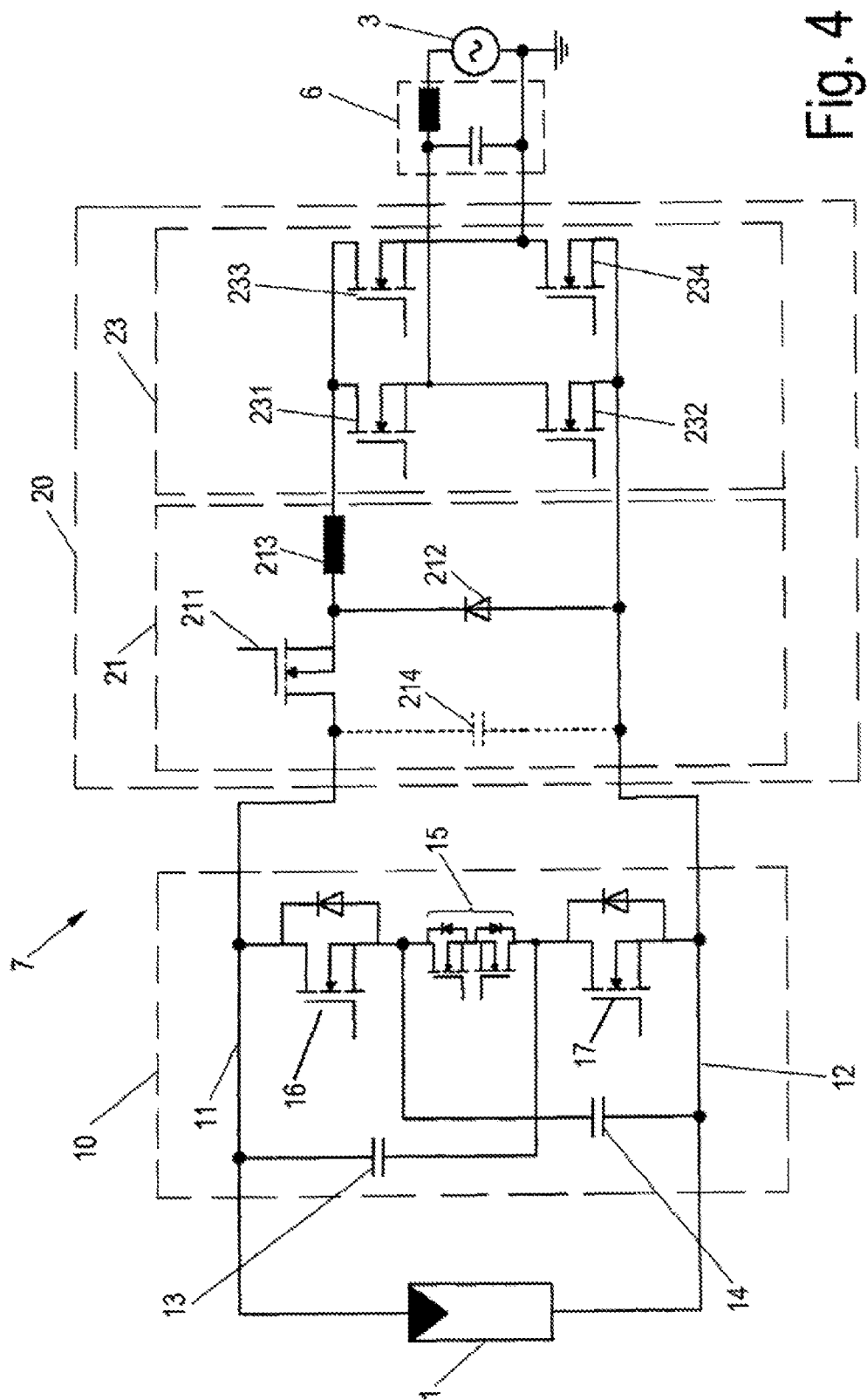
FIG. 4 shows a more detailed schematic illustration of a PV installation in a second embodiment.

FIG. 4 shows a PV installation 7 similar to that shown in FIG. 1, in a more detailed schematic illustration. In this and in the subsequent figures, identical or identically acting elements are provided with the same reference signs as in the previous figures.

The PV installation 7 once again comprises a PV generator 1, which is coupled to an inverter 20 via a capacitor arrangement 10, the inverter being coupled on the output side to a power supply system 3. In this case, a filter 6 for signal shaping is provided in parallel with the output of the inverter 20, the filter here having a capacitor and an inductor. A control device 2 as in FIG. 1 is not illustrated in this embodiment and the following embodiments, for reasons of clarity.

In the present case, the switching members 15-17 of the capacitor arrangement 10 are realized by MOSFETs (Metal-Oxide Semiconductor Field-Effect Transistors). In this case, the switching member 15 is embodied as a bidirectional blocking switch as a result of an antiseries interconnection of two MOSFET transistors. This is necessary if the third operating state III is intended to be adopted, since the voltages at switch 15 in the first operating state I and in the third operating state III have opposite polarities. It is likewise possible for the switching members 15-17 to be realized by other semiconductor power switches, for example IGBTs (Insulated Gate Bipolar Transistors) or bipolar transistors. Alternatively, the switching members 15-17 can also be electromagnetic switches such as relays or contactors. As explained further below in connection with FIG. 7, the switching members 15-17 can in part also be realized as passive switching members by means of diodes.

In the example illustrated, the inverter 20 is formed by a combination of an upstream DC/DC converter 21 and an inverter bridge 23. The upstream DC/DC converter 21 serves for increasing the input voltage range of the inverter 20 for a predefined, constant output voltage. It is formed by an active semiconductor switching element 211 (in the present case a MOSFET transistor), a diode 212 as passive semiconductor switching element, an inductor 213 and optionally an input capacitor 214.

Four semiconductor switching elements 231 to 234 in a known H-bridge circuit are used in the inverter bridge 23.

FIGS. 5 to 7 schematically illustrate as block circuit diagrams different arrangements of a combination of one or more capacitor arrangements with voltage converters.

The arrangement in FIG. 5 has two DC/DC voltage converters 21, 22, which can be part of an inverter 20, for example. It is noted that the illustrated combinations of capacitor arrangement and voltage converters can be used, however, not only in an inverter, but also within DC voltage converters.

The DC/DC converters 21, 22 are connected by their input connections in each case directly in parallel with one of the capacitors 13, 14 of the capacitor arrangement 10. In each case one of the input connections of the DC/DC converters 21, 22 is therefore connected to a connection node 11 or 12, whereas the other connection makes contact with the capacitor arrangement 10 on a respective side of the switching member 15. On the output side, in each case one connection of the DC/DC converters 21, 22 is connected to the switching member 15 in the same way, whereas the other two connections constitute the output nodes of the arrangement. As a result of the direct assignment of in each case one of the DC/DC converters 21, 22 to one of the capacitors 13, 14, the dielectric strength of the DC/DC converters 21, 22 can likewise be chosen, analogously to that of the capacitors 13, 14, to be lower than the maximum intermediate circuit voltage Uzw present at the connection nodes 11, 12. The advantage with regard to the dimensioning of the capacitors 13, 14 as a result of the interconnection of the capacitors 13, 14 via the switching members 15 to 17, as a result of the illustrated advantageous arrangement of the DC/DC converters 21, 22, is applied to the dimensioning thereof with regard to their dielectric strength. In this case, any topologies known from the prior art can be used for the DC/DC converters 21, 22. Examples are given further below in connection with FIGS. 8 and 9.

The embodiment illustrated in FIG. 6 differs in an additional capacitor arrangement 10', which here is arranged on the output side of the two DC/DC converters 21, 22. The further capacitor arrangement 10' is constructed analogously to the capacitor arrangement 10 and is connected, also analogously thereto, to the DC/DC converters 21, 22 and output-side connection nodes 11', 12'. In this configuration, both the intermediate circuit voltage Uzw on the left-hand side and a corresponding intermediate circuit voltage Uzw' on the right-hand side are buffered. The arrangement illustrated can be used as a bidirectionally operating DC/DC voltage converter with a power flow in both directions.

The embodiment illustrated in FIG. 7 differs from the one shown in FIG. 6 in that the switching member 15 of the capacitor arrangement 10 and the switching members 16' and 17' of the further capacitor arrangement 10' are replaced by diodes as passive switching members. In this configuration, the number of active switching members required for the capacitor arrangement 10, 10' is reduced, but the arrangement can no longer be operated bidirectionally, but rather only with a power flow from left to right.

Figure 8:
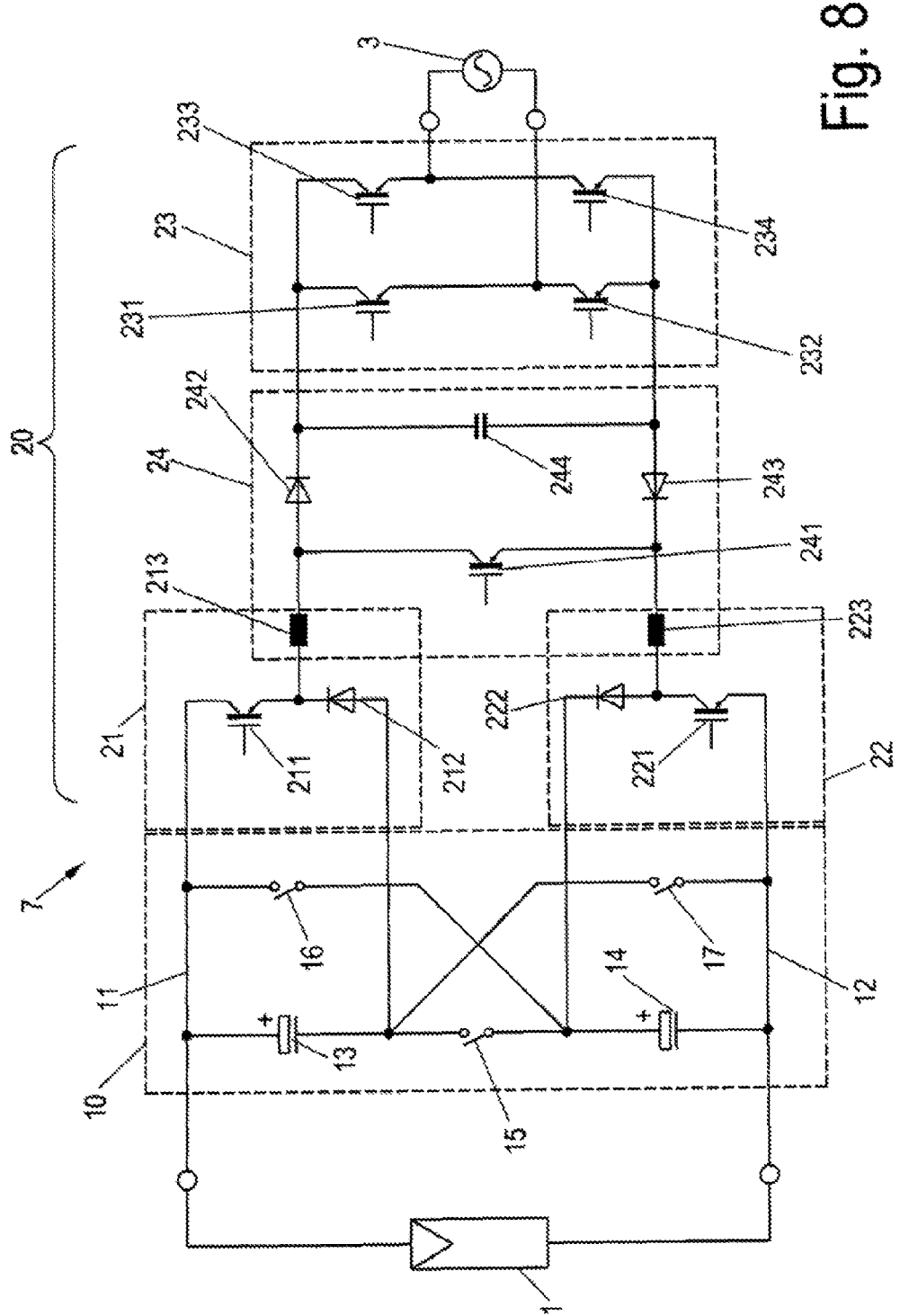
FIGS. 8 and 9 show more detailed schematic illustrations of further embodiments of PV installations.

FIG. 8 shows a PV installation 7 analogous to FIG. 4 in a detailed circuit diagram, wherein use is made of the basic principle—illustrated in FIGS. 5 to 7—of the assignment of individual DC/DC converters to the capacitors of a capacitor arrangement 10 according to the application.

In the example illustrated in FIG. 8, two DC/DC converters 21, 22 are respectively assigned directly to the capacitors 13, 14 of the capacitor arrangement 10. The DC/DC converters 21, 22 each have a semiconductor switching element 211 and 221, respectively, and a diode 212 and 222, respectively. Furthermore, an energy store is in each case provided with the inductors 213 and 223, respectively, which energy stores are, however, simultaneously used as energy stores for a further DC/DC converter 24, connected downstream of the DC/DC converters 21, 22. The DC/DC converter 24 disposed downstream has an active semiconductor switching element 241 and two diodes 242, 243 and a capacitor 244. The further DC/DC converter 24 serves for further increasing the voltage transfer ratio of the inverter 20. Finally, the further DC/DC converter 24 is connected to an inverter bridge 23 having the semiconductor switching elements 231 to 234 in a known H-bridge circuit.

Figure 9:
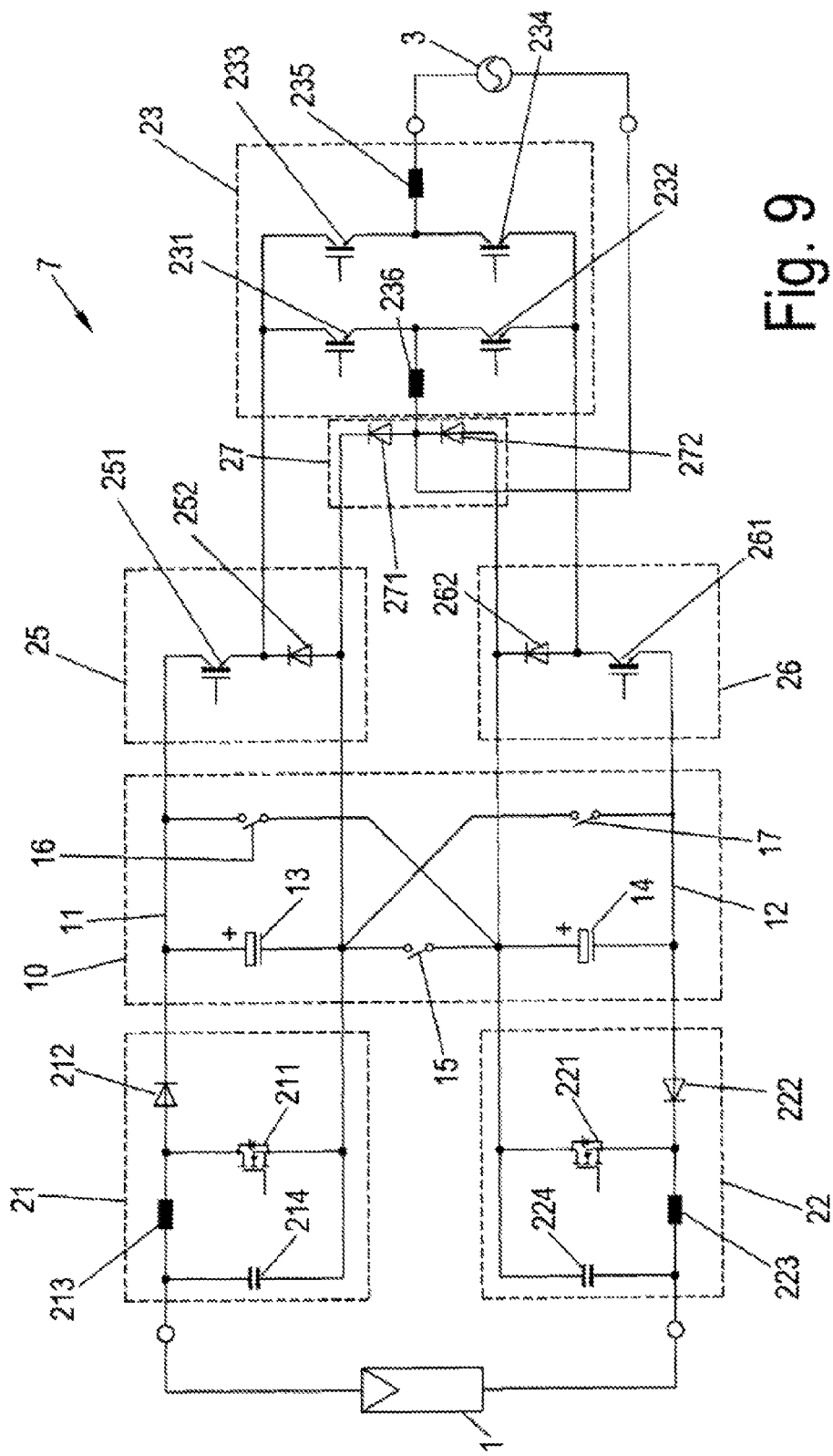

FIG. 9 shows a further embodiment of a photovoltaic installation 7 in which DC/DC converters are assigned directly to capacitors of a capacitor arrangement 10 according to the application.

In this embodiment, this involves DC/DC converters 21 and 22 embodied as step-up converters and arranged between the PV generator 1 and the capacitor arrangement 10, and further DC/DC converters 25 and 26 positioned between the capacitor arrangement 10 and an output-side AC bridge 23 of an inverter.

The DC/DC converters 21 and 22 once again have semiconductor switching elements 211 and 221, respectively, diodes 212 and 222, respectively, inductors 213 and 223, respectively, and capacitors 214 and 224, respectively. The DC/DC converters 25 and 26 are connected to the inverter bridge 23 via a coupling circuit 27 comprising two coupling diodes 271 and 272.

The DC/DC converters 25, 26 are likewise assigned to the capacitors 13 and 14, respectively. The semiconductors of the DC/DC converters 21, 22 and 25, 26, with regard to their dielectric strength, can thus be designed with respect to the maximum voltage present at a respective one of the capacitors 13, 14. The DC/DC converters 25, 26 are incomplete in the indicated circuit topology in so far as they do not have their own inductors, but rather cooperate with inductors 235 and 236 arranged in the inverter bridge 23.

In the case of the topology from FIG. 9, the combination of the incomplete DC/DC converters 25, 26 with the coupling unit 27 and the inverter bridge 23, in the operating state II, corresponds to a so-called three-level NPC (Neutral Point Clamped) topology. In the operating state I, by contrast, the topology shown in FIG. 9 operates analogously to a so-called H5-bridge. The possibility of changeover between these two bridge arrangements results in a large input voltage range in which the arrangement can operate for a given constant output voltage. At the same time, the semiconductor switching elements used in the voltage converters can have a reduced dielectric strength compared with other voltage converter topologies.

The invention claimed is:

1. A capacitor arrangement for an input circuit or intermediate circuit of a single voltage converter, comprising: the single voltage converter comprising an inverter circuit configured to receive a DC voltage at an input thereof and convert the DC voltage to an AC voltage at an output thereof; at least two capacitors and two connection nodes at the input of the inverter circuit, and switching members configured to selectively alter an arrangement of the at least two capacitors with the two connection nodes, wherein the at least two capacitors are connected to the connection nodes in parallel with each other in a first operating state of the switching members and connected to the connection nodes in series with each other in a second operating state of the switching members, wherein the switching members are arranged such that an inflow of charge into the at least two capacitors is prevented in a third operating state in which the at least two capacitors are decoupled from the inverter circuit.

2. The capacitor arrangement as claimed in claim 1, wherein semiconductor switches are used as switching members.

3. The capacitor arrangement as claimed in claim 1, further comprising a control unit configured to selectively switch the switching members based on a voltage present at the connection nodes.

4. A voltage converter arrangement comprising: a single DC/DC converter and/or a single DC/AC converter for a photovoltaic installation: a capacitor arrangement at an input of the single DC/DC converter and/or the single DC/AC converter, the capacitor arrangement comprising: at least two capacitors and two connection nodes, and switching members configured to selectively alter an arrangement of the at least two capacitors with the two connection nodes, wherein the at least two capacitors are connected to the connection nodes in parallel with each other in a first operating state of the switching members and connected to the connection nodes in series with each other in a second operating state of the switching members, wherein the switching members are arranged such that an inflow of charge into the at least two capacitors is prevented in a third operating state in which the at least two capacitors are decoupled from the inverter circuit.

5. The voltage converter arrangement as claimed in claim 4, wherein the arrangement comprises two DC/DC converters, wherein each DC/DC converter is assigned to a respective one of the capacitors of the capacitor arrangement.

6. The voltage converter arrangement as claimed in claim 5, wherein each of the DC/DC converters assigned to the capacitors has in each case two series-connected semiconductor switching elements, wherein at least one of the two series-connected semiconductor switching elements is actively switchable.

7. An operating method for a single voltage converter having an input circuit or an intermediate circuit comprising a capacitor arrangement comprising at least two capacitors and two connection nodes, and switching members, comprising: connecting the capacitor arrangement to an input of the single voltage converter that comprises an inverter circuit configured to receive a DC voltage at an input thereof and convert the DC voltage to an AC voltage at an output thereof; configuring the switching members to interconnect the at least two capacitors in parallel with each other to the two connection nodes as the input circuit or the intermediate circuit at the input of the inverter circuit in a first operating state of the switching members, and configuring the switching members to interconnect the at least two capacitors in series with each other to the two connection nodes as the input circuit or the intermediate circuit at the input of the inverter circuit in a second operating state of the switching members, and configuring the switching members to adopt a third operating state in which the at least two capacitors are decoupled from the connection nodes of the capacitor arrangement in such a way that no charge inflow into the at least two capacitors takes place.

8. The operating method as claimed in claim 7, wherein the first operating state is adopted by the switching members if a voltage present at the connection nodes is less than or equal to a predefined first threshold voltage, and the second operating state is adopted by the switching members if the voltage present at the connection nodes is greater than the first threshold voltage.

9. The operating method as claimed in claim 7, wherein the first operating state is adopted by the switching members if the voltage present at the connection nodes is less than or equal to a predefined first threshold voltage, the second operating state is adopted by the switching members if the voltage present at the connection nodes is greater than the first threshold voltage and less than or equal to a second threshold voltage, and the third operating state is adopted by the switching members if the voltage present at the connection nodes is greater than the second threshold voltage, wherein the second threshold voltage is greater than the first threshold voltage.

10. The operating method as claimed in claim 7, further comprising establishing a switching hysteresis for a changeover between the first and second operating states.

11. The operating method as claimed in claim 7, further comprising adapting a voltage present at the at least two capacitors before a connection of the capacitors in the event of a changeover between the first and second operating states.

\* \* \* \* \*